No. 711,560. Patented Oct. 21, 1902.
W. H. FORD & C. W. STOHLE.
MEANS FOR FORMING CLAWS IN ARTICLES OF JEWELRY.
(Application filed Mar. 24, 1902.)
(No Model.) 2 Sheets—Sheet 1.
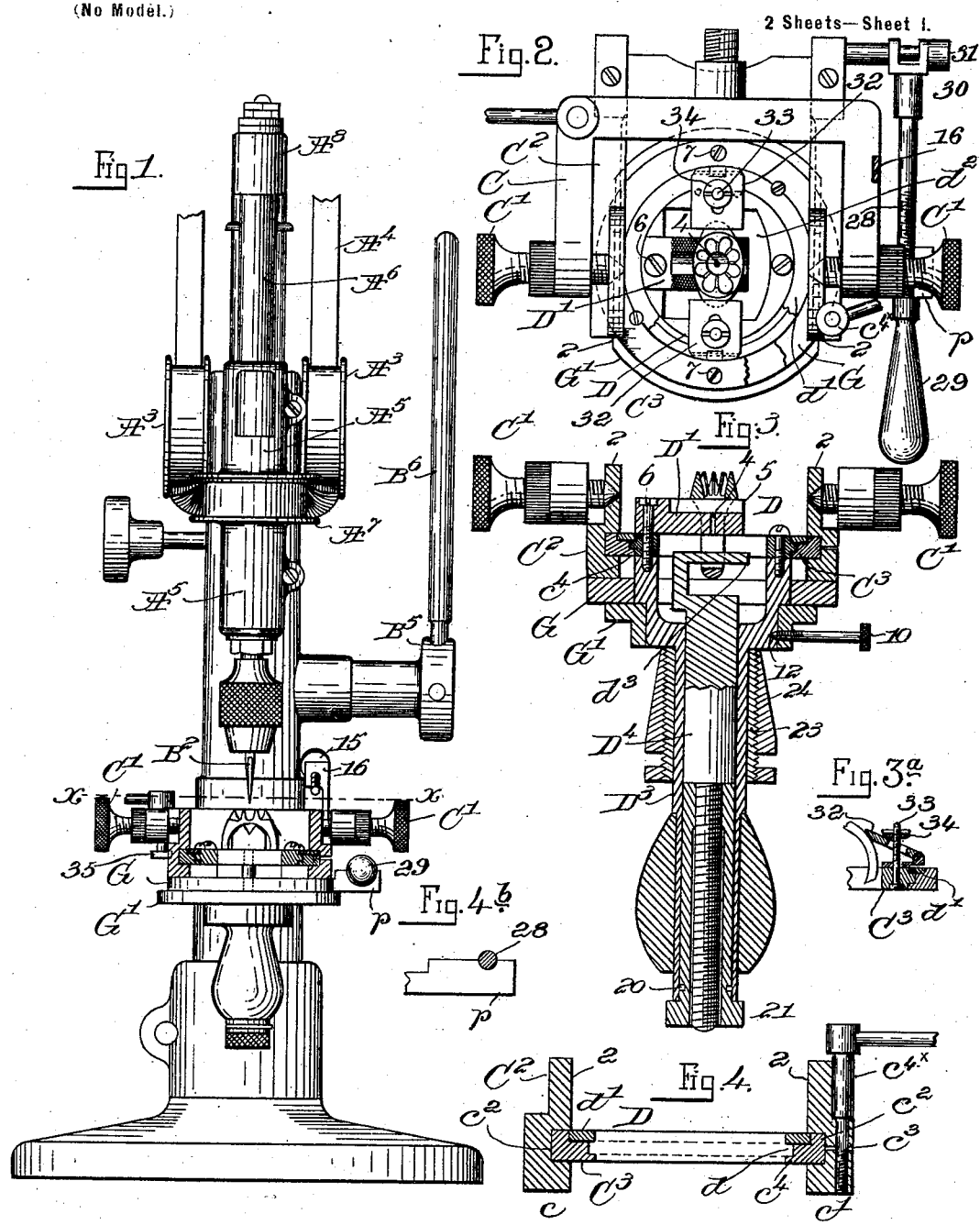
Witnesses.
Lauritz N. Möller
Herman J. Sartoris
Inventors.
William H. Ford,
Carl W. Stohle,
By Crosby Gregory
Attys.
THE NORRIS PETERS CO., PHOTO-LITHO., WASHINGTON, D. C.

No. 711,560. Patented Oct. 21, 1902.
W. H. FORD & C. W. STOHLE.
MEANS FOR FORMING CLAWS IN ARTICLES OF JEWELRY.
(Application filed Mar. 24, 1902.)
(No Model.) 2 Sheets—Sheet 2.
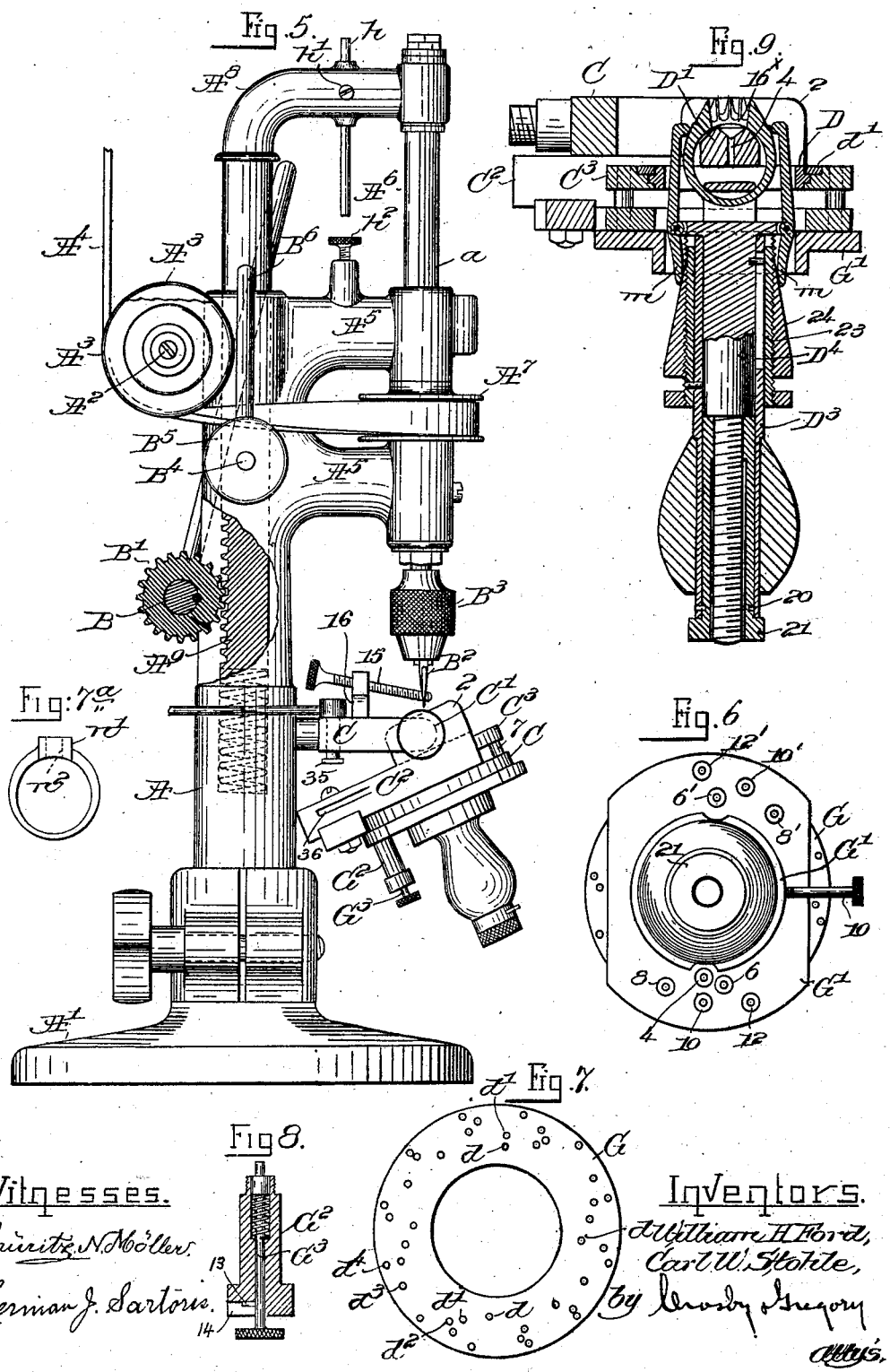

UNITED STATES PATENT OFFICE.

WILLIAM HENRY FORD, OF LOWELL, AND CARL W. STOHLE, OF EVERETT, MASSACHUSETTS, ASSIGNORS TO GEORGE W. GREGORY, OF BOSTON, MASSACHUSETTS.

MEANS FOR FORMING CLAWS IN ARTICLES OF JEWELRY.

SPECIFICATION forming part of Letters Patent No. 711,560, dated October 21, 1902.

Application filed March 24, 1902. Serial No. 99,607. (No model.)

*To all whom it may concern:*

Be it known that we, WILLIAM HENRY FORD, residing at Lowell, and CARL W. STOHLE, residing at Everett, county of Middlesex, State of Massachusetts, citizens of the United States, have invented an Improvement in Means for Forming Claws in Articles of Jewelry, of which the following description, in connection with the accompanying drawings, is a specification, like characters on the drawings representing like parts.

This invention has for its object the production of a machine by which to form claws for holding gems—such as diamonds or other semiprecious stones, pearls, &c.—in articles of jewelry—as, for instance, finger-rings—or wherever claws are to be formed for holding and exposing gems.

The machine to be herein described is adapted not only to cut slots in stock surrounding a jewel-hole therein to form the claws and to space the slots for the formation of claws at uniform or desired distances apart, according to the spacing desired, but also to form and shape claws that are outlined by casting.

The novel machine to be described will contain, preferably, a tool-carrying spindle, clamping or holding means for the stock to be operated upon, and means to sustain said clamping or holding means, so that it may be tipped to enable the tool used to form the claws, but also so that said means for clamping and holding the stock may be rotated step by step to form and shape the claws one after the other.

The especial features in which the invention consists will be described in the specification and set forth in the claims at the end thereof.

Figure 1, in front elevation, partially broken out, shows a machine embodying the machine to be herein claimed. Fig. 2 is an enlarged view below the dotted line $x$, Fig. 1. Fig. 3 is a partial section of Fig. 2 in line with the axes of the screws C'; Fig. $3^a$, a detail of the ring-clamp. Fig. 4 is an enlarged detail to be referred to. Fig. $4^a$ shows one form of wall in a ring that may be cut to form claws; Fig. $4^b$, a detail to be referred to. Fig. 5 is a side elevation of the machine shown in Fig. 1. Fig. 6 is an under side view of the carrier and handle and some attached parts. Fig. 7 is an under side view of the claw-spacing device. Fig. $7^a$ shows part of a ring ready to be drilled and reamed, as shown by dotted lines, to leave a wall to be cut in the formation of claws. Fig. 8 is a sectional detail of the sleeve removed, and Fig. 9 is a modification to be described.

The column A, shown as hollow for part of its length, has a suitable foot A' to stand on a bench or table. The column shown has suitable studs $A^2$ to loosely sustain sheaves $A^3$, over which runs the driving-belt $A^4$. The column also has suitable extensions $A^5$, bored to constitute bearings for a spindle $A^6$, having a suitable groove, as $a$, that receives a key at the interior of a belt-pulley $A^7$, located in the space between the two extensions. The upper end of the spindle $A^6$ is sustained loosely in a bearing at the end of a yoke $A^8$, having a stem $A^9$, that enters the opening in the column, the stem being so shaped that it cannot rotate in said column. The column sustains a shaft B, having a pinion B', that engages teeth cut in the stem $A^9$, so that by rotating said shaft in one or the other direction the yoke and spindle may be moved vertically to secure just the proper working position for the tool $B^2$, that is held firmly at the end of the spindle by any usual or suitable chuck, having as one member thereof a nut $B^3$, conical at its interior, to act in usual manner on usual jaws carried by the spindle. The stem of the yoke is locked in its adjusted position by any usual locking device, shown as a screw $B^4$, having a head $B^5$, provided with a handpiece $B^6$, the end of the screw meeting, it may be, the side of the stem $A^9$.

The parts so far described, with the exception of the tool, are of usual construction and common to so-called "sensitive" drills, and instead of the parts especially shown any other usual or known equivalent devices may be employed.

The tool $B^2$ may vary in its structure according to whether it is to be used to cut or mill stock or to finish the stock smooth or to polish the stock to form a final finish to the claws to be formed in the stock.

The column or some part of the framework will sustain in fixed position a holder C, preferably of yoke shape (see Fig. 2) and provided with pivot-screws C' to constitute pivotal points for a tipping plate $C^2$, said plate, as herein shown, having ears 2 to be entered by said pivot-screws, and by turning the pivot-screws in one or the other direction the plate may be adjusted in any desired position. The tipping plate is shown as a three-sided frame, and the inner sides of the side bars $c$ and $c'$ thereof are provided with ways $c^2$, (see Fig. 4,) in which may slide a carrier $C^3$.

To clamp or accurately lock the carrier in the tipping plate with relation to the pivots C' during the operation of the tool in shaping the prongs, the side bar $c'$ of the tipping plate has been slotted, as at $c^3$, and said bar has been provided with a clamping device $c^{4\times}$, shown as a screw, and by turning the same when the carrier has been properly adjusted in said plate the carrier may be secured or locked in any desired position, and to change the position of the carrier in the tipping plate according to the size of the jewel-hole in the stock we loose the screw, which permits the carrier to be slid in the tipping plate.

The carrier shown is cut out centrally and provided with a ledge $c^4$ to constitute a raceway for a turn-table D. The turn-table has at its periphery a flange $d$, that rests on the ledge $c^4$, and a cap-ring $d'$, applied to the carrier $C^3$ and acting on a ledge of the turn-table, keeps the latter seated in the carrier. The turn-table is shown as cut out centrally, as at $d^2$, and sustains a rest D' for the stock $D^2$ to be acted upon. The rest forms part of the stock clamping or holding means, and the surface of said rest (see Fig. 3) occupies a position in line with the axis about which the tipping plate turns. The top of the rest may have a prick-point 4, (see Fig. 2,) that may aid the workman in setting the jewel-hole properly on the rest, and preferably the free end of the top of the rest will be provided with a groove 5, through which chips left by the cutter may pass out of the jewel-hole, and so not clog the same and interfere with the action of the tool. The rest is shown as secured to the turn-table by a suitable screw 6, and the upper surface of the rest may be scored to thus better engage the inner side of the ring. The turn-table has a depending handle $D^3$, shown as hollow. (See Fig. 3.) The handle receives through it means shown in Fig. 3 as a threaded rod $D^4$, having at its upper end a device $d^3$ to engage the stock, shown as a finger-ring, and force said ring closely on the rest, thus clamping and holding the same firmly in place.

The carrier $C^3$ has connected to it by stud-screws 7 or otherwise a claw-spacing device G, shown (see Fig. 7) as a ring having several series of holes, said series of holes being marked $d$ $d'$ $d^2$ $d^3$ $d^4$, said holes being arranged in paths and the number of holes in the different paths differing in number, each path containing a number of holes to accord with the number of claws to be formed, as, say, four claws, as when a pin $G^3$ enters any of the series of holes designated $d$ said series of holes being represented as formed in the inner path, (see Fig. 7,) the series of holes $d^4$ providing for twelve claws.

The handle $D^3$, depending from the turn-table D, has applied to it a disk G', provided, as shown in Fig. 5, with an adjustable sleeve $G^2$, in which is located a spring-actuated pin $G^3$, said spring acting normally to project the pin through the face of the disk, so that whenever the turn-table, the handle, and disk are rotated, the pin being for such purpose withdrawn from a hole in one of the paths of the claw-spacing device, said pin will enter automatically the next hole in the path and lock the turn-table in the position to enable the formation of the claws in succession. The disk has a series of threaded holes 4, 6, 8, 10, and 12, (see Fig. 6,) and said holes may be numbered to correspond with the particular number of claws that may be formed when the screw-threaded end of the sleeve is made to engage one of the series of threaded holes, the pin $G^3$ engaging either the holes $d$, $d'$, $d^2$, $d^3$, or $d^4$. When the sleeve $G^2$ occupies any of the holes 4, 6, 8, 10, or 12, the claws and scallops are made in the stock in a particular location with relation to the shank of the ring, these holes being used when, say, a claw is to stand in the center of the shank of the ring, measured circumferentially. When, however, the claws are to be so positioned as to leave a space at the particular point of the shank instead of a claw, then the sleeve will be put into one or the other hole of an auxiliary set of holes numbered 6' 8' 10' 12', and so by simply changing the position of the sleeve $G^2$ from the holes 6, 8, 10, or 12 into the holes 6' 8' 10' 12' the claws will be made to stand where the spaces stood when the sleeve occupied the position in holes 6 8 10 12. Therefore by changing the position of the sleeve in the holes referred to the claws and spaces may be made to occupy the desired position with relation to the shank of the ring.

The stock may, if desired, be formed by dies, and the jewel-hole may be surrounded by a solid wall $n$, (see Fig. 4$^a$,) that may be cut at intervals to define any desired number of claws.

If desired, the stock may have a solid part $n'$, and said part may be drilled, as designated by dotted lines at $n^2$, (see Fig. 7$^a$,) and the drilled hole may be reamed to exactly the size of carat or stone to be used. This drilling may be done in the machine herein described by using in the spindle a suitable drill and thereafter changing the drill for a suitable reamer.

When the claws are to be formed by cross-cutting a circular hub or projection $n$ of the stock (see Fig. 4ᵃ) or a circular wall surrounding a circular jewel-hole, the stock firmly clamped on the turn-table will be tipped to enable the tool B² to cut a slot of the width of the tool used, the slot varying in width according to the size of the ring. This first cut is for spacing the claws, and during this time the turn-table and the spacing device are maintained preferably against any rotation whatever one with relation to the other. When, however, the slots to define the spacing of the claws have been cut, thereafter the claws must be reduced in width to bring them to the width desired, and when doing this it is necessary to rotate the turn-table slightly in the carrier, that the tool occupying a position in the slot may enlarge the width of the slot at both sides until the slot or the scallop, which is the finished slot, is of the proper width and the side of the claw is accurately defined as to its shape. To provide in one good way for this slight rotary movement of the turn-table, under, however, the control of the workman, I have inserted (see Fig. 3) in the hub of the disk G' a stop, shown as a screw 10, having a tapered point, and the point of the screw enters a hole 12 (see Fig. 3) made in the handle, and by turning said screw out from said hole more or less space is left between the tapered point and the sides of the hole, and the extent of partial rotation of the turn-table may be thus controlled to enable the spaces between the claws to be made exactly of the desired width.

The outer end of the pin G³ has a milled nut that may be engaged by hand to not only withdraw the pin preparatory to moving the handle, turn-table, and clamped stock between cutting one and the next slot, but by said head the pin may be withdrawn and partially rotated to place a projection 13, extended from the pin, against the outer end of said sleeve, to thereby hold the pin so withdrawn that the pin cannot enter the holes referred to until after the pin is again turned to enable the projection 13 to enter a notch 14 at the end of the sleeve.

By locking the pin outwardly, as described, any hole in any path may be omitted and any slot cut in the stock may be brought quickly into position opposite the tool to enable the side of any claw to be retouched.

To provide for the depth of the slots or scallops made in the stock, the extent to which the turn-table holding the stock may be tipped must be regulated.

To regulate the extent of the tipping of the tipping plate carrying the turn-table, the frame C is shown as provided with a depth-regulating device 15, shown as an adjustable screw rotatable in an offset stand 16, the end of the screw abutting the upper surface of one of the ears 2 of the tipping plate, and by adjusting this regulating device the slots or scallops may be made of any desired depth.

For cutting claws about a circular hole in the stock the carrier containing the turn-table will be set for each size of circular hole and when once set will not be reset during the finishing of a ring.

For circular work the carrier will be so positioned that the end of the tool will occupy a position eccentric to the center of the jewel-hole, and the end of the tool will be positioned with relation to the ring-holding clamp to occupy a position distant from the bottom of the jewel-hole substantially equal to the depth of the uncut part of the stock about said hole and below what is to be the bottom of the scallops. By adjusting, therefore, the position of the tool vertically the bottom of the scallop may be made to incline from the outer side of the stock inwardly toward the jewel-hole more or less to leave the inner wall $16^\times$ of said hole of any desired depth.

It will be understood that by adjusting the position of the carrier sustaining the turn-table with relation to the path of the tool a definite pivotal point is gained, about which the carrier, turn-table, and stock may tip, and this tipping-point may be varied according to the varied adjustments of the carrier, the size of the jewel-hole in the ring, and the inclination and depth desired for the scallops.

The tipping-point of the carrier is always a little outside of the pivotal point of the tipping frame on the screws C', and the differences between these centers define the eccentricity between the position of the tool and the center of the jewel-hole in the stock.

For cutting the claws about jewel-holes other than round the ring is first centered or clamped, as for all round work; but after each operation of the tool and the cutting of a slot to define or form a claw the clamp $c^{4\times}$ is loosened, and the carrier and turn-table are changed in their position in the tipping plate to secure for the stock the same position with relation to the tool prior to each cut that the stock and tool occupied when making the first cut to outline a clamp, and, if desired, the regulating device may be adjusted to determine the inclination or shape of the bottoms of the scallops or spaces between the claws.

With an expert workman the stop or device to limit automatically the partial to-and-fro movement of the turn-table when widening the spaces between the sides of the claws need not be used.

Referring to Fig. 3, the tubular portion of the handle D³ has a suitable pin 20, that enters an annular groove in a nut 21, screwed onto the threaded part of the extension of the threaded rod D⁴, shown as having the finger to enter the finger-ring and aid in seating it on the rest D'. The rotation of the nut 21 enables the rod D⁴ to be moved vertically, that the projection $d^3$ at its upper end may engage a ring of any finger size and retain it on the rest D'. The tubular part of the handle D³ is shown as surrounded by a threaded sleeve 23, that in turn is surrounded by a tapering nut 24.

To define the exact position of the carrier in the plate sustaining it and the position of the stock with relation to the tool, and consequently the depth of the cut made by the tool, the plate G has been provided with an ear $p$, having threads with which coact threads 28 of a rotatable shaft 29, having connected loosely therewith at its inner end a block 30, in turn pivoted upon a stud 31, extended from the plate $C^2$. By rotating the shaft 29 when the clamping device $c^4$ is loosened the carrier $C^3$ and turn-table may be slid accurately in said plate for any desired direction, according to the work to be done. To hold the ring on the rest $D'$ by pressure from the outside of the ring, the turn-table (see Fig. 2) is provided with two clamps 32, hinged or pivoted at their outer ends to the turn-table. (See Fig. 3ª.) Each clamp is provided with a slot, through which rises a screw-post 33, erected on the turn-table, the rotation of nuts 34 on said post causing said clamps to seat the ring firmly on the rest $D'$ and keep it seated while the tool acts to cut the stock.

As a modification in the clamping means to act on the exterior of the ring and seat it on the rest we may use a pair of jaws $m$, the acting faces of which are located above the turn-table and contact with the exterior of the ring, the closing movement of the jaws acting to seat the ring firmly on the surface of the rest $D'$, the jaws $m$ being actuated by the tapering nut 24 or in any other usual manner.

The holder C is shown as provided with a button 35, that may be turned to enter a slot 36 in the frame $C^2$ whenever it is desired for any reason to lock the plate in horizontal position while the tool acts on the stock.

The claws of the ring to be formed in this machine may be cast with and project from the shank of the ring in usual manner, and the sides of the claws of such a ring when clamped on the rest may be acted upon and formed to the required thickness, and the scallop between the claws may be made of the proper width and depth.

The invention herein shown is not limited to the exact shape or construction of the different parts illustrated, and the construction of the parts may be variously modified without departing from the gist of the invention as expressed in the claims, we intending to cover any known or equivalent devices.

We believe that we are the first to form the claws and spaces in an article of jewelry by means of a tool carried by a spindle, the longitudinal axis of the tool being in line with the longitudinal axis of the spindle, and also to employ with such a tool any means whatever for tipping the means sustaining the ring, so that the tool will act on the sides of the claws, and also to rotate the means employed to clamp the ring in position that one claw after another may be formed, and also the first to provide spacing means by which to adjust the means holding the ring in one and then in another position that the claws may be spaced uniformly apart and the number of the claws be changed to suit the customer.

The carrier $C^3$ may be provided with a scale (see Fig. 2) by which to accurately adjust the carrier in the tipping plate to thereby secure greater exactness in the work to be done.

The yoke $A^8$ has a depending pin $h$, held in position by a set-screw $h'$, and the lower end of this pin, when the yoke $A^8$ is lowered to put the tool $B^2$ in working position in the jewel-opening, meets the stop $h^2$ and insures for the end of the tool $B^2$ exactly the proper distance above the rest D, that the depth of the edge $16^\times$, surrounding the jewel-opening close to the inner side of the ring next the finger, may be of any desired depth, or so that the inner ends of the scallops will not meet the inner side of the shank of the ring.

Having described our invention, what we claim, and desire to secure by Letters Patent, is—

1. In a machine of the class described, a spindle, a cutting-tool therein, a turn-table, means to clamp and hold in position on said turn-table a ring having a hole to contain a jewel that the tool may enter said hole, means to tip the means for clamping the stock, and means to regulate the extent of tipping movement to the stock that the tool may cut a slot of the desired depth.

2. In a machine of the class described, a spindle having a cutting-tool, means to clamp and hold a ring, means to enable the means holding the ring to be tipped that the tool may form the claws, and means to enable the means for holding the ring to be revolved for a short distance in one and then in the opposite direction to enable the space between the sides of adjacent claws to be widened as desired.

3. In a machine of the class described, a spindle having a tool, means to axially rotate said tool, a turn-table, means sustained thereby for clamping and holding a finger-ring, and means to sustain said turn-table and permit it to be rotated and tipped as the tool acts to form the claws.

4. In a machine of the class described, a spindle having a milling-tool, means to clamp and hold a finger-ring having a jewel-opening intersecting the finger-hole to be entered by said tool, a turn-table sustaining said ring-holding means, a carrier supporting said turn-table, and means to sustain said carrier, the movement of said carrier and turn-table in a plane to intersect the longitudinal axis of the milling-tool causing the tool to cut the claw of a ring outwardly from said jewel-opening.

5. In a machine of the class described, a tool-carrying spindle, a tipping plate, a carrier therein, means sustained by said carrier to clamp and hold a ring, means to adjust the said carrier and said ring that the tool in forming the claws as the plate and ring are tipped will form the bottoms of the slots between the claws to the desired depth and inclination.

6. In a machine of the class described, a spindle carrying a cutting-tool, means to sustain a ring while its claws are being formed, means to enable the means holding the ring to be tipped while forming the sides of the claws, and spacing means to enable the claws to be uniformly spaced.

7. In a machine of the class described, a spindle provided with a cutting-tool, a tipping plate having its pivotal point substantially intersecting the longitudinal axis of the tool, a rest to sustain a ring while its claws are formed, said rest occupying a position substantially in line with the pivots about which the tipping plate turns, a turn-table sustaining said rest, a carrier adjustable in said tipping plate and sustaining said turn-table, and means to adjust said carrier in said tipping plate that the ring may tip about an axis parallel to the axis of the tipping plate at one side thereof.

8. In a machine of the class described, a spindle having a cutting-tool, means to sustain, clamp and hold a ring having a jewel-opening, means to adjust the means sustaining, clamping and holding the ring to place the center of the jewel-opening eccentric to the longitudinal axis of the spindle, and means to tip the ring sustaining clamping and holding means that the tool in forming the sides of the claws may incline the bottoms of the scallops between the claws uniformly and leave at the inner end of the jewel-opening an uncut wall.

9. In a machine of the class described, a turn-table, means sustained thereby to clamp and hold a ring, a carrier in which said turn-table is revoluble, a freely-tipping plate on which said carrier is slidably mounted, means to lock the carrier in its adjusted position, and a depth-regulating device to limit the extent to which said carrier may be tipped.

10. In a machine of the class described, a turn-table having a handle provided with a hole, a carrier to sustain said turn-table, a disk surrounding said handle, and provided with a tapering screw to enter the hole in the handle, the turning outwardly of said screw enabling the turn-table to be moved circularly for a definite distance.

11. In a machine of the class described, a rotatable spindle, a tool carried thereby, means to clamp and hold the stock to be cut by the tool, a freely-tipping pivoted plate to sustain the means for clamping and holding the stock that the plate and stock may be tipped about the pivotal point of the plate while the tool acts to cut a slot of the desired depth in the stock.

12. In a machine of the class described, a spindle, a tool carried thereby, means to clamp and hold a finger-ring, means to tip the means for clamping and holding the ring while the claws are being formed, spacing means, and means coacting with said spacing means to change the location of the claws and spaces with relation to the shank of the ring as described.

13. In a machine of the class described, a rest to enter and sustain a ring, means to seat the interior of the ring firmly on said rest, and means to tip the rest and the ring thereon that a tool may form jewel-holding claws on the ring.

14. In a machine of the class described, a spindle, a tool carried thereby, the longitudinal axis of the tool coinciding with the longitudinal axis of the spindle, means to sustain a ring, and means to change the relative positions of the ring-sustaining means and spindle during the rotation of the spindle and tool to form claws on the shank of the ring.

15. In a machine of the class described, a tool-carrying spindle, a tipping plate, pivots to sustain said plate, a carrier slidably mounted in said plate, means supported by said carrier to sustain a ring in which the claws are to be formed, and means to clamp the carrier in said tipping plate that the axial center of the ring in the tipping movement of the carrier and tipping plate may turn in the arc of a circle eccentric to the pivots sustaining the tipping plate to thereby define the depth of the scallops between the claws.

16. In a machine of the class described, a rotatable spindle having a tool coincident with the longitudinal axis of the spindle, rotatable ring sustaining and clamping means, means to change the relative positions of the ring-sustaining means and the tool while forming the sides of each claw, and spacing means to control the extent of rotation of the ring-sustaining means step by step to enable the claws to be spaced uniformly.

17. A spindle carrying a cutting-tool, a carrier having a turn-table provided with means to sustain an article of jewelry, a tipping plate in which said carrier is slidably mounted, the pivotal point of said plate intersecting a line extended through the longitudinal axis of said spindle, a shaft sustained independently of said carrier and having a worm operatively connected with said carrier, said shaft in its rotation sliding said carrier to position accurately the article of jewelry with relation to the cutting-tool, preparatory to tipping said plate and forming claws around an elongated hole in the article of jewelry.

18. A tool-carrying spindle, a carrier provided with a threaded ear, a turn-table sustained by said carrier and provided with means to sustain an article of jewelry, a plate in which said carrier is slidably mounted, and a rotatable shaft pivoted on the frame of the machine and provided with a worm that may be made to engage said ear and change the position of the carrier in the plate sustaining the carrier after each operation of the tool in forming a claw to thereby enable the position of the article of jewelry to be changed with relation to the tool prior to each operation thereof according to the work to be done.

19. In a machine of the class described, a turn-table, a rest to enter a ring, and clamping means acting on the outer side of the body of the ring to hold it seated firmly on said rest.

20. In a machine of the class described, a turn-table, and a rest to sustain a ring, said rest having a groove for the discharge of chips.

21. In a machine of the class described, a carrier, means to sustain the same, a turn-table mounted in said carrier, a handpiece connected with said turn-table and extended downwardly therefrom through the carrier, a ring-rest connected with said turn-table, and means to clamp a ring on said rest.

22. In a machine of the class described, a carrier, means to sustain the same, a turn-table mounted in said carrier, a handpiece connected with said turn-table, a ring-rest connected with said turn-table, and means to clamp a ring on said rest, and means to clamp the carrier in any position in which it may be adjusted.

23. A spindle having a tool, a carrier having a turn-table to support a ring to be acted upon by said tool, a carrier-sustaining plate pivoted to turn about an axis intersecting the longitudinal axis of the spindle, means to adjust said carrier, turn-table and ring-support that the longitudinal center of said turn-table may be located at one side of the tipping-line of said plate according to the diameter of the hole in the ring having the claws.

24. In a machine of the class described, a turn-table, a rest to enter a ring, and clamping means acting against the interior of the ring to hold it firmly on said rest.

25. In a machine of the class described, a carrier, means to sustain the same, a turn-table mounted in said carrier, a handpiece connected with said turn-table, a ring-rest connected with said turn-table, and means to clamp a ring on said rest.

In testimony whereof we have signed our names to this specification in the presence of two subscribing witnesses.

WILLIAM HENRY FORD.
CARL W. STOHLE.

Witnesses:
GEO. W. GREGORY,
WM. WARD TUTTLE.